(12) United States Patent
Chen et al.

(10) Patent No.: US 12,170,564 B2
(45) Date of Patent: *Dec. 17, 2024

(54) BEAM TRAINING METHOD AND DEVICE, COMMUNICATION SYSTEM

(71) Applicant: DATANG MOBILE COMMUNICATIONS EQUIPMENT CO., LTD., Beijing (CN)

(72) Inventors: Shanzhi Chen, Beijing (CN); Shaohui Sun, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,896

(22) Filed: Sep. 15, 2023

(65) Prior Publication Data

US 2024/0007172 A1      Jan. 4, 2024

Related U.S. Application Data

(63) Continuation of application No. 17/717,596, filed on Apr. 11, 2022, now Pat. No. 11,811,481, which is a
(Continued)

(30) Foreign Application Priority Data

Aug. 11, 2017      (CN) .......................... 201710687836.7

(51) Int. Cl.
*H04B 7/06*      (2006.01)
*H04B 7/08*      (2006.01)
(Continued)

(52) U.S. Cl.
CPC ........... *H04B 7/0695* (2013.01); *H04B 7/088* (2013.01); *H04W 24/10* (2013.01); *H04W 72/046* (2013.01); *H04W 72/1263* (2013.01)

(58) Field of Classification Search
CPC .... H04B 7/0617; H04B 17/309; H04B 7/088; H04B 7/0408; H04B 7/0695; H04B 7/0632; H04B 7/08
See application file for complete search history.

(56) References Cited

U.S. PATENT DOCUMENTS

2013/0039345 A1* 2/2013 Kim ..................... H04B 7/0408
                                                                    370/332
2018/0145807 A1* 5/2018 Nagata ................... H04B 7/088
(Continued)

OTHER PUBLICATIONS

Huawei et al: "Beam indication for DL control channel",3GPP TSG RAN WG1 NR Ad Hoc Meering; R1-1709927, 3rd Generation Partnership Project (3GPP), Qingdao, China, Jun. 26, 2017.
Huawei et al: "DL beam management", 3GPP TSG RAN WG1 Meering #88b; R1-1704229, 3rd Generation Partnership Project (3GPP), Spokane, USA; Apr. 7, 2017.
Huawei et al: "General views on DL beam management", 3GPP TSG RAN WG1 NR Ad Hoc Meeting; R1-1711636, 3rd Generation Partnership Project (3GPP), Qingdao, China; Jun. 30, 2017.
(Continued)

*Primary Examiner* — Romani Ohri
(74) *Attorney, Agent, or Firm* — Meunier Carlin & Curfman LLC

(57) ABSTRACT

Disclosed are beam training methods and devices. A beam training method includes: a transmitting end determining a first mapping relationship between BPL identifiers, CRIs, and transmitting beams; the transmitting end configuring a first reference signal resource for a receiving end, and transmitting configuration information of the first reference signal resource to the receiving end, the configuration information including a first BPL identifier; the transmitting end determining a first transmitting beam; the transmitting end transmitting a reference signal to the receiving end, by using the first transmitting beam within the first reference signal resource, so that the receiving end receives the reference signal on the first reference signal resource.

18 Claims, 6 Drawing Sheets

Related U.S. Application Data continuation of application No. 16/638,121, filed as application No. PCT/CN2018/096891 on Jul. 24, 2018, now Pat. No. 11,342,978.

(51) Int. Cl.
  *H04W 24/10* (2009.01)
  *H04W 72/044* (2023.01)
  *H04W 72/1263* (2023.01)

(56) References Cited

U.S. PATENT DOCUMENTS

| | | | |
|---|---|---|---|
| 2019/0007122 A1* | 1/2019 | Furuskog | H04W 36/305 |
| 2019/0074880 A1* | 3/2019 | Frenne | H04B 7/0617 |
| 2020/0127710 A1* | 4/2020 | Athley | H04B 7/0695 |
| 2020/0195324 A1* | 6/2020 | Grant | H04L 5/0051 |

OTHER PUBLICATIONS

Nokia et al: "BPL definition and Spatial QCL time indication", 3GPP TSG RAN WG1 #89; R1-1708906, 3rd Generation Partnership Project (3GPP), Hangzhou, P.R., China; May 19, 2017.

CATT: "Downlink beam indication", 3GPP TSG RAN WG1 Meeting #90; R1-1712377, 3rd Generation Partnership Project (3GPP), Prague, Czechia; Aug. 25, 2017.

Huawei et al: "DL beam management framework", 3GPP TSG RAN WG1 Meeting #90; R1-1712221, 3rd Generation Partnership Project (3GPP), Prague, Czech Republic; Aug. 25, 2017.

Huawei et al: "Beam indication for control and data channels", 3GPP TSG RAN WG1 Meeting #90; R1-1712222, 3rd Generation Partnership Project (3GPP), Prague, Czech Republic; Aug. 21-25, 2017.

Extended European Search Report issued in EP18844917.7, mailed Jul. 17, 2020.

* cited by examiner

BEAM TRAINING METHOD AND DEVICE, COMMUNICATION SYSTEM

This application is a continuation application of U.S. patent application Ser. No. 17/717,596. The U.S. patent application Ser. No. 17/717,596 is a continuation application of U.S. patent application Ser. No. 16/638,121. The U.S. patent application Ser. No. 16/638,121 is a US National Stage of International Application No. PCT/CN2018/096891, filed on Jul. 24, 2018, which claims the priority from Chinese Patent Application No. 201710687836.7, filed with the China National Intellectual Property Administration on Aug. 11, 2017 and entitled "Beam Training Method and Device, Communication System", the contents of which are hereby incorporated by reference in their entireties.

FIELD

The present application relates to the field of communication technologies, and particularly to a beam training method and device and a communication system.

BACKGROUND

At present, in order to further improve the Multiple-Input Multiple-Output (MIMO) technology, the large-scale antenna technology is introduced into the mobile communication system. For a base station, the large-scale antenna array may have up to 512 or even 1024 antenna oscillators. When the full-digital antenna is used, each antenna oscillator is connected to one Transceiver Unit (TXRU), and there may be up to 512 or even 1024 TXRUs at this time. For a terminal, the antenna array with up to 32/64 antenna oscillators may also be configured. The huge beam-forming gain may be obtained by the beamforming at the base station and terminal sides, to compensate for the signal attenuation caused by the path loss. In particular, the path loss of the high-frequency communication (for example, at frequency point of 30 GHz) is more serious than that of the low-frequency communication, so that the coverage area of the wireless signal is extremely limited. Through the beamforming technology of large-scale antennas, the coverage area of the wireless signal may be extended to the practical range.

In order to further improve the performance of the analog beamforming, there is also a transceiver scheme of digital-analog hybrid beamforming, which balances between the flexibility of the digital beamforming and the low complexity of the analog beamforming, and has the ability to support the simultaneous formalization of multiple data streams and multiple users. At the same time, the complexity is also controlled within the reasonable range.

At present, both the analog beamforming and the digital-analog hybrid beamforming need to adjust the analog beamforming weights at the transmitting and receiving ends, so that the beams formed by them can be aligned with the opposite end of the communication. For the downlink transmission, the beamforming weights sent by the base station side and the beamforming weights received by the terminal side need to be adjusted, while for the uplink transmission, the beamforming weights sent by the terminal side and received by the base station side need to be adjusted. The beamforming weights are usually obtained by sending the training signals.

In the existing analog beam training process, the transmitting end needs to send all transmitting beams, to facilitate the receiving end to search for the best receiving beam. However, in the system using the large-scale antenna array, the number of beams may reach 256, 1024 or more, so the beam training process is expensive and inefficient.

SUMMARY

The embodiments of the present application provide a beam training method and device and a communication system, so as to reduce the overhead of the beam training process between a transmitting end and a receiving end.

An embodiment of the present application provides a beam training method, which includes:
  determining, by a transmitting end, a first mapping relationship between Beam Pair Link (BPL) identifiers and transmitting beams;
  configuring, by the transmitting end, first reference signal resource for a receiving end, and transmitting configuration information of the first reference signal resource to the receiving end, wherein the configuration information carries a first BPL identifier.

In the above-mentioned beam training method provided by the embodiment of the present application, the mapping relationship between BPL identifiers and CRIs is configured for the receiving end at the transmitting end, and the first BPL identifier is carried in the configuration information of the reference signal resource, so that only the BPL identifier is required to enable the receiving end receiving the reference signal resource transmitted by the transmitting end to determine the receiving beam, and the BPL identifier may further be used by the transmitting end and the receiving end to maintain and update the BPL mapping relationship, thereby reducing the system overhead of the beam training process.

Optionally, in the above-mentioned beam training method provided by the embodiment of the present application, the first mapping relationship specifically includes: a mapping relationship among BPL identifiers, Channel state information-first reference signal Resource Indicators (CRIs) and transmitting beams.

Optionally, in the above-mentioned beam training method provided by the embodiment of the present application, the method further includes:
  updating, by the transmitting end, a first transmitting beam corresponding to the first BPL identifier in the first mapping relationship.

Optionally, in the above-mentioned beam training method provided by the embodiment of the present application, updating, by the transmitting end, the first transmitting beam corresponding to the first BPL identifier in the first mapping relationship, specifically includes:
  transmitting, by the transmitting end, a reference signal to the receiving end within the first reference signal resource so that the receiving end performs measurement and reporting for the reference signal;
  updating, by the transmitting end, the first transmitting beam corresponding to the first BPL identifier in the first mapping relationship according to a measurement reporting result for the reference signal transmitted by the receiving end.

Optionally, in the above-mentioned beam training method provided by the embodiment of the present application, the method further includes:
  transmitting, by the transmitting end, a reference signal to the receiving end within the first reference signal resource by using a first transmitting beam corresponding to the first BPL identifier so that the receiving end updates a second mapping relationship;

where the second mapping relationship specifically includes: a mapping relationship among BPL identifiers, CRIs and receiving beams.

Optionally, in the above-mentioned beam training method provided by the embodiment of the present application, the receiving end updates a second mapping relationship, which specifically includes:
  updating, by the receiving end, a first receiving beam corresponding to the first BPL identifier in the second mapping relationship.

Optionally, in the above-mentioned beam training method provided by the embodiment of the present application, the transmitting end determines the first mapping relationship by:
  configuring, by the transmitting end, second reference signal resource for the receiving end;
  transmitting, by the transmitting end, a reference signal to the receiving end within the second reference signal resource so that the receiving end performs measurement and reporting for the reference signal;
  determining, by the transmitting end, the first mapping relationship from a measurement reporting result for the reference signal transmitted by the receiving end.

Optionally, in the above-mentioned beam training method provided by the embodiment of the present application, the method further includes:
  transmitting, by the transmitting end, a mapping relationship between BPL identifiers and CRIs to the receiving end.

An embodiment of the present application provides a beam training method, which includes:
  determining, by a receiving end, a second mapping relationship between BPL identifiers and receiving beams;
  receiving, by the receiving end, configuration information of first reference signal resource transmitted by a transmitting end, wherein the configuration information contains a first BPL identifier;
  receiving, by the receiving end, a reference signal transmitted by the transmitting end through the first reference signal resource.

Optionally, in the above-mentioned beam training method provided by the embodiment of the present application, the second mapping relationship specifically includes: a mapping relationship among BPL identifiers, Channel state information-first reference signal Resource Indicators (CRIs) and receiving beams.

Optionally, in the above-mentioned beam training method provided by the embodiment of the present application, the method further includes:
  updating, by the receiving end, a first receiving beam corresponding to the first BPL identifier in the second mapping relationship.

Optionally, in the above-mentioned beam training method provided by the embodiment of the present application, updating, by the receiving end, the first receiving beam corresponding to the first BPL identifier in the second mapping relationship, specifically includes:
  receiving, by the receiving end, a reference signal transmitted by the transmitting end, and updating the first receiving beam corresponding to the first BPL identifier in the second mapping relationship according to a measurement result for the reference signal.

Optionally, in the above-mentioned beam training method provided by the embodiment of the present application, the receiving end receives the reference signal by using a first receiving beam corresponding to the first BPL identifier;

the method further includes:
  reporting, by the receiving end, a measurement result for the reference signal to the transmitting end so that the transmitting end updates a first mapping relationship;
  the first mapping relationship specifically includes: a mapping relationship among BPL identifiers, CRIs and transmitting beams.

Optionally, in the above-mentioned beam training method provided by the embodiment of the present application, the transmitting end updates the first mapping relationship, which specifically includes:
  updating, by the transmitting end, a transmitting beam corresponding to the first BPL identifier in the first mapping relationship.

Optionally, in the above-mentioned beam training method provided by the embodiment of the present application, the receiving end determines the second mapping relationship by:
  receiving, by the receiving end, configuration information of second reference signal resource transmitted by the transmitting end;
  receiving, by the receiving end, a reference signal transmitted by the transmitting end within the second reference signal resource, determining a receiving beam corresponding to each second reference signal resource, and determining a mapping relationship between CRIs and receiving beams;
  receiving, by the receiving end, a mapping relationship between BPL identifiers and CRIs transmitted by the transmitting end;
  determining, by the receiving end, the second mapping relationship according to the mapping relationship between CRIs and receiving beams as well as the mapping relationship between BPL identifiers and CRIs.

An embodiment of the present application provides a beam training device, which includes:
  a first unit configured to determine a first mapping relationship between BPL identifiers and transmitting beams;
  a second unit configured to configure first reference signal resource for a receiving end, and transmit configuration information of the first reference signal resource to the receiving end, wherein the configuration information carries a first BPL identifier.

Optionally, in the above-mentioned beam training device provided by the embodiment of the present application, the first mapping relationship specifically includes: a mapping relationship among BPL identifiers, Channel state information-first reference signal Resource Indicators (CRIs) and transmitting beams.

Optionally, in the above-mentioned beam training device provided by the embodiment of the present application, the first unit is further configured to:
  update a first transmitting beam corresponding to the first BPL identifier in the first mapping relationship.

Optionally, in the above-mentioned beam training device provided by the embodiment of the present application, the first unit updates the first transmitting beam corresponding to the first BPL identifier in the first mapping relationship, which specifically includes:
  transmitting a reference signal to the receiving end within the first reference signal resource so that the receiving end performs measurement and reporting for the reference signal;
  updating the first transmitting beam corresponding to the first BPL identifier in the first mapping relationship according to a measurement reporting result for the reference signal transmitted by the receiving end.

Optionally, in the above-mentioned beam training device provided by the embodiment of the present application, the second unit is further configured to:

transmit a reference signal to the receiving end within the first reference signal resource by using a first transmitting beam corresponding to the first BPL identifier so that the receiving end updates a second mapping relationship;

where the second mapping relationship specifically includes: a mapping relationship among BPL identifiers, CRIs and receiving beams.

Optionally, in the above-mentioned beam training device provided by the embodiment of the present application, the receiving end updates a second mapping relationship, which specifically includes:

the receiving end updating a first receiving beam corresponding to the first BPL identifier in the second mapping relationship.

Optionally, in the above-mentioned beam training device provided by the embodiment of the present application, the first unit determines the first mapping relationship by:

configuring second reference signal resource for the receiving end;

transmitting a reference signal to the receiving end within the second reference signal resource so that the receiving end performs measurement and reporting for the reference signal;

determining the first mapping relationship from a measurement reporting result for the reference signal transmitted by the receiving end.

Optionally, in the above-mentioned beam training device provided by the embodiment of the present application, the second unit is further configured to:

transmit a mapping relationship between BPL identifiers and CRIs to the receiving end.

An embodiment of the present application provides a beam training device, which includes:

a third unit configured to determine a second mapping relationship between BPL identifiers and receiving beams;

a fourth unit configured to receive configuration information of first reference signal resource transmitted by a transmitting end, wherein the configuration information contains a first BPL identifier;

a fifth unit configured to receive a reference signal transmitted by the transmitting end through the first reference signal resource.

Optionally, in the above-mentioned beam training device provided by the embodiment of the present application, the second mapping relationship specifically includes: a mapping relationship among BPL identifiers, Channel state information-first reference signal Resource Indicators (CRIs) and receiving beams.

Optionally, in the above-mentioned beam training device provided by the embodiment of the present application, the third unit is further configured to:

update a first receiving beam corresponding to the first BPL identifier in the second mapping relationship.

Optionally, in the above-mentioned beam training device provided by the embodiment of the present application, the third unit updates the first receiving beam corresponding to the first BPL identifier in the second mapping relationship, which specifically includes:

receiving a reference signal transmitted by the transmitting end, and update the first receiving beam corresponding to the first BPL identifier in the second mapping relationship according to a measurement result for the reference signal.

Optionally, in the above-mentioned beam training device provided by the embodiment of the present application, the fifth unit is specifically configured to receive the reference signal by using a first receiving beam corresponding to the first BPL identifier;

the fifth unit is further configured to:

report a measurement result for the reference signal to the transmitting end so that the transmitting end updates a first mapping relationship;

the first mapping relationship specifically includes: a mapping relationship among BPL identifiers, CRIs and transmitting beams.

Optionally, in the above-mentioned beam training device provided by the embodiment of the present application, the transmitting end updates the first mapping relationship, which specifically includes:

the transmitting end updating a transmitting beam corresponding to the first BPL identifier in the first mapping relationship.

Optionally, in the above-mentioned beam training device provided by the embodiment of the present application, the third unit determines the second mapping relationship by:

receiving configuration information of second reference signal resource transmitted by the transmitting end;

receiving a reference signal transmitted by the transmitting end within the second reference signal resource, determining a receiving beam corresponding to each second reference signal resource, and determining a mapping relationship between CRIs and receiving beams;

receiving a mapping relationship between BPL identifiers and CRIs transmitted by the transmitting end;

determining the second mapping relationship according to the mapping relationship between CRIs and receiving beams as well as the mapping relationship between BPL identifiers and CRIs.

A communication system provided by an embodiment of the present application includes any one of the above-mentioned beam training devices provided by the embodiments of the present application.

An embodiment of the present application provides a beam training device, which includes:

a memory configured to store program instructions;

a processor configured to invoke the program instructions stored in the memory, and perform any one of the above-mentioned beam training methods in accordance with the obtained program.

An embodiment of the present application provides another beam training device, which includes:

a memory configured to store program instructions;

a processor configured to invoke the program instructions stored in the memory, and perform any one of the above-mentioned beam training methods in accordance with the obtained program.

DETAILED DESCRIPTION OF THE EMBODIMENTS

Figure 1:
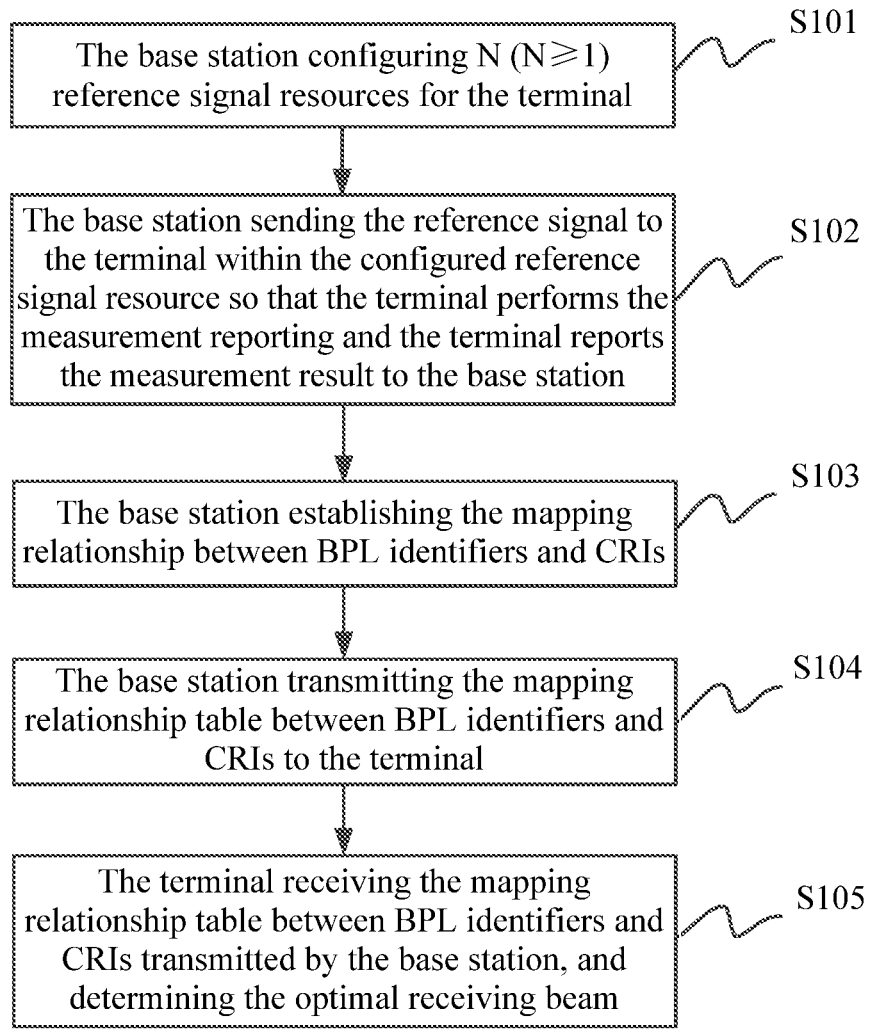
FIG. 1 is a flow schematic diagram of a beam training method (including the transmitting end and the receiving end) provided by an embodiment of the present application.

In order to make the purposes, technical solutions and advantages of the invention clearer, the technical solutions in the embodiments of the invention will be described clearly and completely below in combination with the accompanying drawings in the embodiments of the invention. Obviously, the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the invention, the base station (e.g., access point) may be the device in the access network communicating with the wireless terminal via one or more sectors over the air interface. The base station may be used to perform the interconversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

In order to make the objects, technical solutions and advantages of the present application clearer, the present application will be further illustrated below in details with reference to the accompanying figures. Obviously, the described embodiments are merely a part of the embodiments of the present application but not all the embodiments. Based upon the embodiments of the present application, all of other embodiments obtained by those ordinary skilled in the art without creative work pertain to the protection scope of the present application.

In order for the receiving end to set the receiving beams reasonably prior to the data transmission, the transmitting end needs to notify the receiving end of the information related to the transmitting beams of the data channel or control channel (the Demodulation Reference Signal (DMRS) of the data or control channel). One notification way is to pass the Quasi-Co-Located (QCL) hypothesis to the receiving end, that is, to instruct the receiving end that the DMRS port of the data or control channel thereof is QCL with the ports of which reference signals with respect to the spatial parameters (mean value of space arrival angles, or expansion of space arrival angles, or mean value of space start angles, or expansion of space start angles, etc.). If two signals are QCL for one spatial parameter, the spatial parameters of one signal may be inferred from the spatial parameters of the other signal (for example, the spatial parameters of the two signals are the same). If the transmitting end notifies the receiving end that the DMRS of the data or control channel thereof is QCL with the ports of which reference signal(s) with respect to the spatial parameters, the receiving end may estimate the spatial parameters based on the ports of these reference signals, determine the receiving beams, and receive the data or control signals by using these receiving beams.

In the embodiments of the present application, the reference signal is taken as the Channel State Information-Reference Signal (CSI-RS) as an example, that is, the transmitting end notifies the receiving end that the DMRS of the data or control channel thereof is QCL with the reference signal transmitted by which CSI-RS resource with respect to the spatial parameters. For example, the base station (transmitting end) configures N CSI-RS resources for the terminal (receiving end), and the signal of each CSI-RS resource is transmitted through one beam. The terminal measures N CSI-RS resources and selects Q CSI-RS resources with the best quality, and feeds back the identifiers of the Q CSI-RS resources and the quality indexes thereof to the base station. The quality index may be Reference Signal Receiving Power (RSRP) or Reference Signal Receiving Quality (RSRQ) or the like. The base station receives the information fed back by the terminal and accordingly determines the transmitting beams for transmission, thereby determining the CSI-RS resource which is QCL with the DMRS of the data or control channel. The base station sends the CSI-RS Resource Indicator (CRI) to the terminal, so that the terminal sets the appropriate receiving beam.

In the existing analog beam training process, the transmitting end needs to send all transmitting beams, to facilitate the receiving end to search for the best receiving beam. However, in the system using the large-scale antenna array, the number of beams may reach 256, 1024 or more, and one indication of the beam information requires 8 bits, 10 bits or even more. Therefore, an embodiment of the present application provides a beam training method to reduce the system overhead in the beam training process.

In the following, the transmitting end is taken as a base station and the receiving end is taken as a terminal (UE) as an example. A processing method related to the beam training between the transmitting end and the receiving end provided by an embodiment of the present application is as shown in FIG. 1 and specifically includes following steps.

Step S101: the base station configuring N (N 1) reference signal resources for the terminal.

One reference signal resource includes several time-frequency resources, for example, several Resource Elements (REs) within one Orthogonal Frequency Division Multiplexing (OFDM) symbol. The reference signal resource may appear repeatedly in the time domain, for example, may appear repeatedly at a certain period, or may appear multiple times in one period.

Step S102: the base station sending the reference signal to the terminal within the configured reference signal resource so that the terminal performs the measurement reporting and the terminal reports the measurement result to the base station.

At the Base Station Side:

The reference signals of P (P≥1) antenna ports may be mapped in each reference signal resource. The reference signals transmitted from different reference signal resources may be transmitted by using different downlink transmitting beams. It is assumed that the base station has $N_T^{BS}$ candidate downlink transmitting beams in total, each downlink beam corresponds to a set of beamforming weights, and the transmission beamforming weight of the $n^{th}$ beam is $W_n = [w_1^n\ w_2^n\ \ldots\ w_K^n]^T$, where K is the number of beamforming antenna units and may be less than the number of antenna units of the base station. For example, when one downlink beam is sent from only K antenna units connected to one transceiver unit, the number K of beamforming antenna units is less than the number of antenna units of the base station.

The base station selects one reference signal resource to transmit the corresponding downlink reference signal for each candidate downlink transmitting beam. For example, for $N_T^{BS}$ downlink transmitting beams, the base station may configure $N_T^{BS}$ reference signal resources, and the reference signal of each beam is mapped to one reference signal resource for transmission.

For example, when the base station has 256 downlink transmitting beams, the base station configures 256 reference signal resources, and the reference signal of each beam is mapped to one reference signal resource for transmission. The reference signal of each downlink transmitting beam is formed by using the beamforming weight corresponding to the beam and then is sent on its mapped reference signal resource.

Optionally, in a specific implementation and in the above-mentioned method of indicating the beam information provided by the embodiment of the present application, the N reference signal resources described above are periodic or semi-persistent resources, that is, the reference signals are transmitted periodically or semi-persistently.

At the Terminal Side:

The terminal receives the reference signals transmitted by the base station, and determines the receiving beam corresponding to each reference signal resource. The receiving beam of the terminal may be selected from the candidate receiving beams. The terminal has a total of $N_R^{UE}$ receiving beams, each receiving beam corresponds to a set of beamforming weights, and the receiving beamforming weight of the $n^{th}$ beam is $V_n = [v_1^n\ v_2^n\ \ldots\ v_L^n]^T$, wherein L is the number of beamforming antenna oscillators, and L may be less than the number of antenna oscillators of the terminal. For the reference signal on one CSI-RS resource, the terminal may try to receive it by using each receiving beam respectively, and select the receiving beam with the strongest received signal power as the receiving beam of the CSI-RS resource.

Optionally, in a specific implementation, the terminal stores the receiving beam corresponding to each CSI-RS resource. Of course, the terminal may also store the receiving beams corresponding to a part of the CSI-RS resources, which is not limited here. Here, the terminal may store the mapping relationship between CSI-RS Resource Indicators (CRIs) and receiving beams.

Optionally, in a specific implementation and in the above-mentioned method of indicating the beam information provided by the embodiment of the present application, the base station may also configure the CSI-RS resources for the terminal by means of resource collection. For example, the base station configures S CSI-RS resource sets for the terminal. $N_s$ CSI-RS resources are contained in the $s^{th}$ resource set. Thus, there are many ways to identify the CSI-RS resources, which are illustrated below.

First Way:

Resource set index+CSI-RS resource index: the CSI-RS resource index here refers to the serial number of the CSI-RS resource in one set; each CSI-RS resource is uniquely determined by two indexes: Resource Set Index (RSI) and CSI-RS Resource Index (CRI).

Second Way:

CSI-RS resource index: all the CSI-RS resources in the CSI-RS resource set are numbered uniformly.

Regardless of the configuration and identification way, the subsequent description of the embodiments of the present application uniformly uses CRI to represent the CSI-RS resource index. If the way of "resource set index+CSI-RS resource index" is used, the CRI is replaced by (RSI, CRI).

Step S103: the base station establishing the mapping relationship between Beam Pair Link (BPL) identifiers and CRIs.

The mapping relationship between BPL identifiers and CRIs defines the mapping relationship between BPL identifiers and CRIs. The number of BPL identifiers may be a preset value or determined by the base station itself. If the number of BPL identifiers is determined by the base station, the number needs to be notified by the base station to the terminal through signaling. Generally, the number of BPL identifiers is much less than the number of downlink transmitting beams. For example, when there are 256 downlink transmitting beams, the number of BPL identifiers is 4 or 8.

The CRIs to which the BPL identifiers are mapped may be determined by the base station through the measurement reporting of the terminal, and the base station establishes the mapping table according to the measurement result reported by the terminal.

Each BPL identifier in the mapping table is mapped to one CSI-RS resource (represented by CRI). Since different CSI-RS resources are transmitted by different downlink transmitting beams, different BPL identifiers represent different downlink transmitting beams.

In one example of BPL mapping as shown in Table 1 below, the number of BPL identifiers in Table 1 is 2, the BPL identifier '0' is mapped to CRI0 and corresponds to the transmitting beam (Tx beam) 0, and the BPL identifier '1' is mapped to CRI1 and corresponds to the Tx beam 1.

TABLE 1

| BPL identifier | CRI | Transmitting beam (saved by base station) |
| --- | --- | --- |
| 0 | CRI0 | Tx Beam 0 |
| 1 | CRI1 | Tx Beam 1 |

In a specific implementation and in the above-mentioned method of indicating the beam information provided by the embodiment of the present application, the terminal receives the downlink reference signals transmitted by the base station and selects Q reference signal resources.

The way in which the terminal selects the reference signal resource transmitted by the base station is illustrated below by following example.

After receiving the reference signal resources transmitted by the base station, the terminal measures the received signal of each reference signal resource, calculates the qualities of its received signals, and selects Q reference signal resources with the strongest receiving quality, i.e., the first Q reference signal resources after ranking the receiving qualities from high to low, where the indicator of the receiving qualities may be RSRP or RSRQ or the like.

Optionally, in a specific implementation, the value of Q may be determined by the base station and notified to the terminal, or determined by the terminal itself, which is not limited here. For example, the terminal may determine the value of Q according to the number of independent instances with the receiving quality greater than a certain threshold.

The terminal feeds back the identifiers of the Q reference signal resources to the base station.

For example, when N=256 (N is the number of CSI-RS resources transmitted by the base station) and Q=2 (Q is the number of CSI-RS resources selected by the terminal), the terminal reports the identifiers of two CSI-RS resources (CRIs) it has selected and the corresponding RSRPs thereof, as shown in Table 2 below:

TABLE 2

| CRI | RSRP |
| --- | --- |
| 24 | −80 dBm |
| 37 | −78 dBm |

After receiving the information reported by the terminal, the base station establishes the BPL mapping table as shown in Table 3 below (assuming that the serial number of the transmitting beam of the base station corresponding to the serial number x of the CRI is also x):

TABLE 3

| BPL identifier | CRI | Serial number of transmitting beam (saved by base station) |
| --- | --- | --- |
| 0 | 24 | 24 |
| 1 | 37 | 37 |

The fact that the base station establishes the BPL mapping table with reference to the information reported by the terminal described above means that the base station may not establish the BPL mapping table completely in accordance with the information reported by the terminal. For example, in the case when the terminal still reports in accordance with the content shown in Table 2, the base station may, based on its own considerations, e.g., based on the requirements of multi-user pairing or other reasons, establish the mapping relationship table among BPL identifiers, CRIs and transmitting beams as shown in Table 3-1 below:

TABLE 3-1

| BPL identifier | CRI | Serial number of transmitting beam (saved by base station) |
| --- | --- | --- |
| 0 | 24 | 24 |
| 1 | 47 | 47 |

Step S104: the base station transmitting the mapping relationship table between BPL identifiers and CRIs to the terminal.

For example, the following Table 4 corresponding to the step S103 is sent to the terminal (the serial number information of the transmitting beams is only stored at the base station side and may not be sent to the terminal):

TABLE 4

| BPL identifier | CRI |
| --- | --- |
| 0 | 24 |
| 1 | 37 |

Optionally, in a specific implementation and in the above-mentioned method of indicating the beam information provided by the embodiment of the present application, the mapping relationship table between BPL identifiers and CRIs described above may be transmitted by the base station to the terminal through high-level signaling, where the high-level signaling for example may refer to Radio Resource Control (RRC) signaling or Media Access Control (MAC) layer signaling.

Step S105: the terminal receiving the mapping relationship table between BPL identifiers and CRIs transmitted by the base station, and determining the optimal receiving beam.

The terminal determines the mapping relationship between BPL identifiers and receiving beams according to the saved mapping relationship between CRIs and receiving beams.

For example, the mapping relationship table as shown in Table 5 is established. It is assumed that the terminal has a total of 8 receiving beams, the optimal receiving beam for receiving the CSI-RS resource 24 is the receiving beam 4 and the optimal receiving beam for receiving the CSI-RS resource 37 is the receiving beam 7, then the terminal establishes the mapping relationship as shown in Table 5 below. Here, the mapping relationship between BPL identifiers and CRIs is obtained by the terminal from the base station.

TABLE 5

| BPL identifier | CRI | Serial number of receiving beam (saved by terminal) |
| --- | --- | --- |
| 0 | 24 | 4 |
| 1 | 37 | 7 |

In this way, the method of indicating the beam information provided by the present application limits the resources occupied in the beam information indication process by establishing the mapping relationship between BPLs and CRIs, thereby reducing the system overhead of the beam information indication process.

Optionally, in a specific implementation and in the above-mentioned method of indicating the beam information provided by the embodiment of the present application, the basis on which the base station establishes the mapping relationship between BPL identifiers and CRIs in the step S103 may not be the measurement result reported by the base station, that is, even if there is a report from the terminal, the base station may not be limited to select the CRI mapped to the BPL identifier from the CRIs selected and reported by the terminal. For example, in the above example, the terminal selects and reports the CRI 24 and CRI 37, but in order to better support multi-user transmission, the base station may establish the mapping relationship as shown in Table 3-1 below.

Therefore, the above steps S101 and S102 are not necessary steps.

Optionally, in a specific implementation and in the above-mentioned method of indicating the beam information provided by the embodiment of the present application, after the steps S101-S105, the base station and the terminal establish the mapping relationship between BPL identifiers and CRIs, and the base station may alter the transmitting beam mapped to the BPL identifier after the base station transmits the mapping relationship to the terminal, and the terminal can normally receive the altered transmitting beam as long as there is no need to alter the receiving beam. In this case, the mapping relationship between BPL identifiers and CRIs is not updated, that is, the base station does not need to send an update message to the terminal. Correspondingly, after the terminal receives the mapping relationship between BPL identifiers and CRIs, the terminal may also alter the receiving beam mapped to the BPL identifier.

The specific process of updating the transmitting beam and receiving beam will be introduced below.

Figure 2:
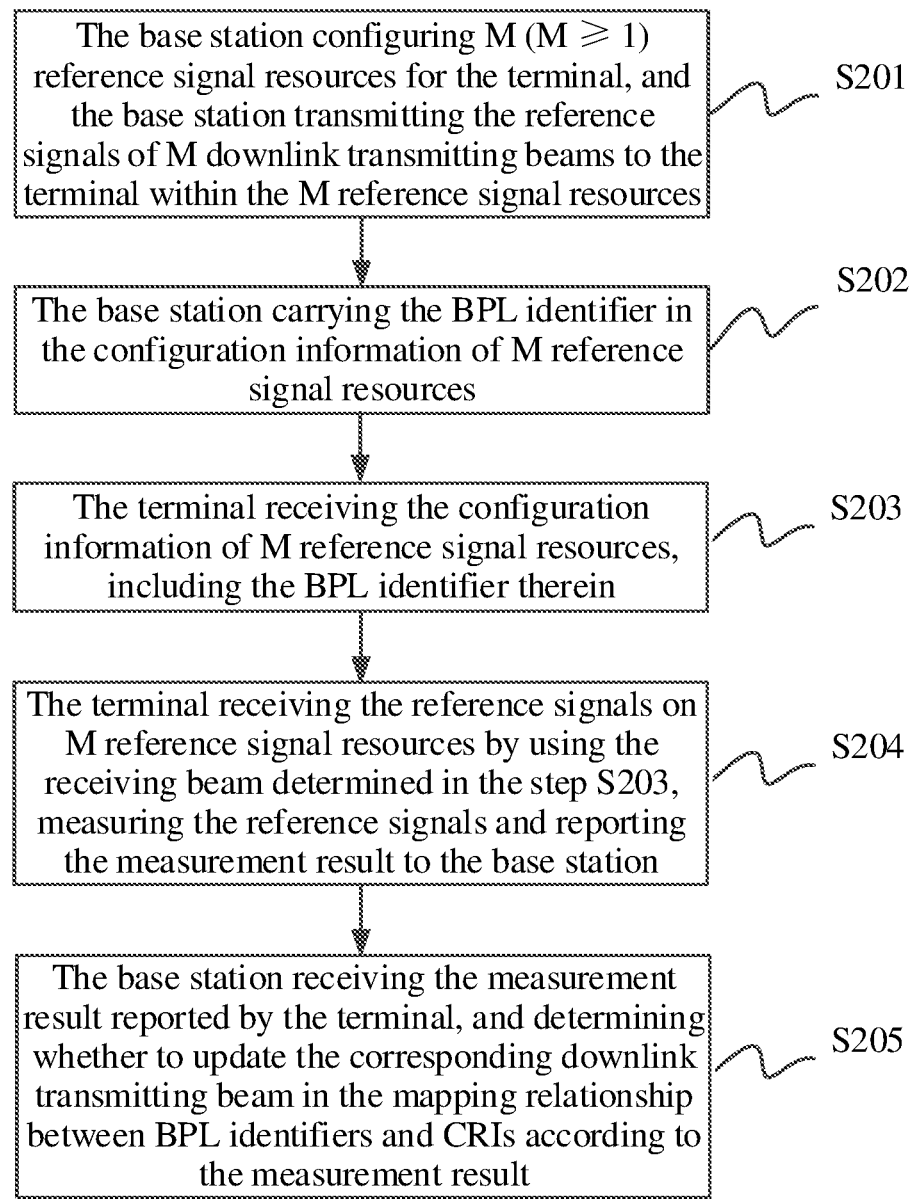
FIG. 2 is a flow schematic diagram of updating the transmitting beam at the base station side in the beam training method provided by an embodiment of the present application.

Referring to FIG. 2, the transmitting beam update process at the base station side includes:

Step S201: after the above steps S101-S105 (optionally), the base station configuring M (M≥1) reference signal resources for the terminal, and the base station transmitting the reference signals of M downlink transmitting beams to the terminal within the M reference signal resources.

The base station determines M downlink transmitting beams according to the mapping relationship established in the steps S101-S105. For example, the M downlink transmitting beams are the downlink transmitting beams related to one CRI in the mapping relationship, then the mapping relationship is as shown in Table 6 below as an example:

TABLE 6

| BPL identifier | CRI | Transmitting beam (saved by base station) |
|---|---|---|
| 0 | CRI0 | Tx Beam 0 |
| 1 | CRI1 | Tx Beam 1 |

If the base station selects the downlink transmitting beam (Tx beam 0) corresponding to the CRI0, the spatial correlation between M downlink transmitting beams and Tx beam 0 is higher than a certain value, or the angle difference of the spatial directions is within a certain range. In a specific implementation, in order to expand the coverage area of M beams, the base station may also transmit the beams in a larger range to the terminal.

Step S202: the base station carrying the BPL identifier in the configuration information of M reference signal resources.

The BPL identifier is for example the BPL identifier corresponding to the CRI selected by the base station in the step S201. If the base station selects the downlink transmitting beam (Tx beam 0) corresponding to the CRI0, referring to Table 6, it can be seen that the corresponding BPL identifier is 0.

If M reference signal resources are aperiodic resources, the BPL identifier information may also be carried in its aperiodic trigger signaling.

Step S203: the terminal receiving the configuration information of M reference signal resources, including the BPL identifier therein.

The terminal determines the downlink receiving beam corresponding to the BPL identifier in the received configuration information of M reference signal resources according to the mapping relationship between BPLs and receiving beams (for example, the mapping relationship shown in Table 5) determined in the step S105. For example, if the BPL identifier is referring to Table 5, the determined receiving beam is the receiving beam numbered 4.

Step S204: the terminal receiving the reference signals on M reference signal resources by using the receiving beam determined in the step S203, and measuring these reference signals. Based on the measurement result, the terminal may select Q CSI-RS resources therein, and feed back the identifiers corresponding to the Q CSI-RS resources and the quality indexes thereof to the base station, where the signal quality index may be for example RSRP. The identifiers of the CSI-RS resources may be fed back in the form of CRI, where the value of the serial number of the CRI may be 0 to M−1.

Step S205: the base station receiving the measurement result reported by the terminal, and determining whether to update the corresponding downlink transmitting beam in the mapping relationship between BPL identifiers and CRIs according to the measurement result.

That is illustrated below by way of example.

First Embodiment

It is assumed that the mapping relationships between CRIs and BPL identifiers established by the base station and the terminal are as shown in Tables 7 and 8 below:

The mapping relationship saved at the base station side (specifically including the correspondence among CRIs, BPL identifiers and transmitting beam numbers):

TABLE 7

| BPL identifier | CRI | Serial number of transmitting beam (saved by base station) |
|---|---|---|
| 0 | 24 | 24 |
| 1 | 37 | 37 |

The mapping relationship saved at the terminal side (specifically including the correspondence among CRIs, BPL identifiers and receiving beam numbers):

TABLE 8

| BPL identifier | CRI | Serial number of receiving beam (saved by terminal) |
|---|---|---|
| 0 | 24 | 4 |
| 1 | 37 | 7 |

It is assumed that M=8, the BPL identifier carried by the base station in 8 reference signal resources is 1, and the base station selects 8 downlink transmitting beams related to the transmitting beam 37.

Specifically, it is assumed that the spatial pointing angles corresponding to the transmitting beams 36, 37, and 38 are T36, T37 and T38 respectively, then the spatial angular directions of 8 downlink transmitting beams selected by the base station may be: T36, T36+d, T36+2d, . . . , T36+6d, T38 respectively, wherein d=(T38−T36)/7. To avoid confusion, these 8 beams are denoted as a0, a1, . . . , a7 respectively.

As shown in Table 8, the terminal uses the receiving beam 7 to receive the reference signals on 8 reference signal resources. After the measurement, the terminal selects one of 8 reference signal resources. It is assumed that this resource is resource 0, the corresponding downlink transmitting beam is a0, and the terminal reports the identifier of the CSI-RS resource 0 to the base station.

The base station makes a judgement after receiving the CSI-RS resource identifier reported by the terminal. If the base station judges that the quality of the beam a0 selected by the terminal is better than the quality of the downlink transmitting beam 37 corresponding to the BPL identifier 1, the base station modifies the downlink transmitting beam corresponding to the BPL identifier 1 to a0.

The updated mapping relationship table among CRIs, BPL identifiers and transmitting beams at the base station side is as shown in Table 9 below:

TABLE 9

| BPL identifier | CRI | Transmitting beam (saved by base station) |
| --- | --- | --- |
| 0 | 24 | 24 |
| 1 | 37 | a0 |

The mapping relationship at the terminal side is not changed.

The base station may alter the transmitting beam mapped to the BPL identifier, and the terminal can normally receive the data or signaling transmitted by the base station using the altered transmitting beam as long as there is no need to alter the receiving beam, that is, it is not necessary to notify the terminal after the mapping relationship saved at the base station side is updated as long as the mapping relationship between BPL identifiers and CRIs is not changed.

Figure 3:
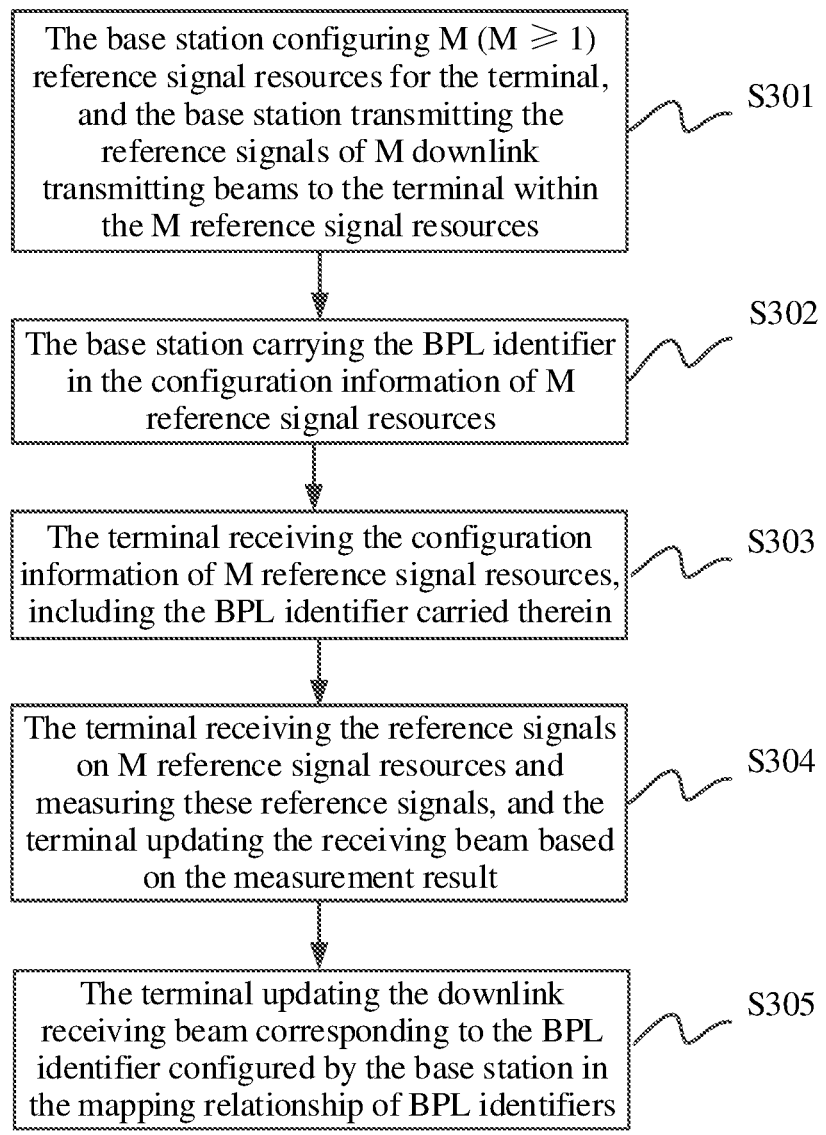
FIG. 3 is a flow schematic diagram of updating the receiving beam at the terminal side in the beam training method provided by an embodiment of the present application.

Correspondingly, referring to FIG. 3, update the receiving beam at the terminal side:
- Step S301: after the above steps S101-S105, the base station configuring M (M≥1) reference signal resources for the terminal, and the base station transmitting the reference signals of M downlink transmitting beams to the terminal within the M reference signal resources.

The base station determines M downlink transmitting beams according to the mapping relationship established in the steps S101-S105. For example, the M downlink transmitting beams are the downlink transmitting beams related to one CRI in the mapping relationship, then the mapping relationship is as shown in Table 6 in the above step S201 as an example. The base station selects the downlink transmitting beam (Tx beam 0) corresponding to the CRI0, and the corresponding BPL identifier is 0.
- Step S302: the base station carrying the BPL identifier in the configuration information of M reference signal resources.

The BPL identifier is for example the BPL identifier corresponding to the CRI selected by the base station in the step S301, i.e., BPL 0. If M reference signal resources are aperiodic resources, the BPL identifier information may also be carried in its aperiodic trigger signaling.
- Step S303: the terminal receiving the configuration information of M reference signal resources, including the BPL identifier carried therein.
- Step S304: the terminal receiving the reference signals on M reference signal resources and measuring these reference signals. Based on the measurement result, the terminal updating the receiving beam.

Specifically, for example, the terminal receives the reference signals on M reference signal resources respectively by using M receiving beams, and takes the beam with the highest received signal quality as the new receiving beam, where the signal quality index may be for example RSRP.
- Step S305: the terminal updating the downlink receiving beam corresponding to the BPL identifier configured by the base station (i.e., the BPL identifier obtained by the terminal in the step S303) in the mapping relationship among BPLs, CRIs and receiving beams stored by the terminal, for example, updates the content of the third column in Table 5.

That is illustrated below by way of example.

First Embodiment

It is assumed that the mapping relationships between CRIs and BPL identifiers established by the base station and the terminal are as shown in the above Tables 7 and 8 respectively.

It is assumed that M=8, the BPL identifier carried by the base station in 8 reference signal resources is 1, and the base station transmits the reference signals on 8 reference signal resources to the terminal by using the transmitting beam 37.

The terminal receives the reference signals on the 8 reference signal resources respectively by using 8 receiving beams. It may be better to set the receiving quality of the reference signal resource 0 to be the best, and the receiving beam corresponding to the reference signal resource 0 is r0.

Then the terminal modifies the downlink receiving beam corresponding to the BPL identifier 1 to r0.

The updated mapping relationship table among CRIs, BPL identifiers and receiving beams at the terminal side is as shown in Table 10 below:

TABLE 10

| BPL identifier | CRI | Receiving beam (saved by terminal) |
| --- | --- | --- |
| 0 | 24 | 4 |
| 1 | 37 | r0 |

The mapping relationship at the base station side remains unchanged.

Optionally, in a specific implementation and in the above-mentioned method of indicating the beam information provided by the embodiment of the present application, the transmitting and receiving relationship between the base station and the terminal may be interchanged, which is not limited here. In the above examples, the base station is the transmitting end and the terminal is the receiving end.

Figure 4:
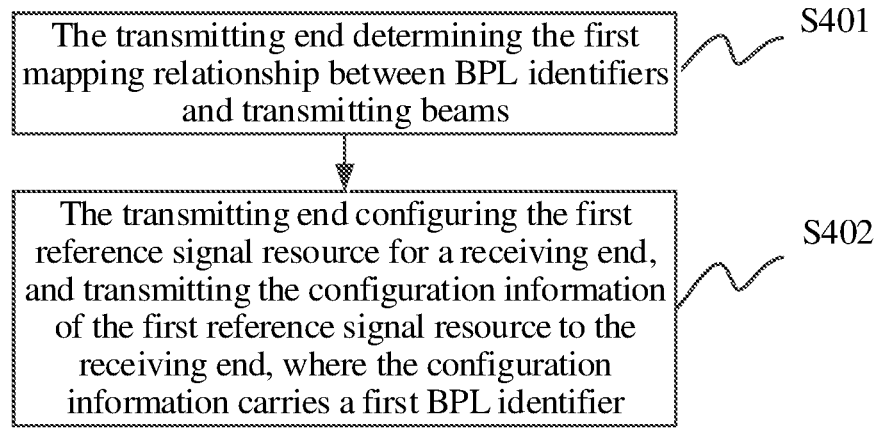
FIG. 4 is a flow schematic diagram of a beam training method (transmitting end) provided by an embodiment of the present application.

In summary, as shown in FIG. 4, at the transmitting end, a beam training method provided by an embodiment of the present application includes:

Step S401: the transmitting end determining the first mapping relationship between BPL identifiers and transmitting beams;

Step S402: the transmitting end configuring the first reference signal resource for a receiving end, and transmitting the configuration information of the first reference signal resource to the receiving end, where the configuration information carries a first BPL identifier.

For the sake of clarity and for distinguishing from other reference signal resources mentioned in the description, the reference signal resource configured by the transmitting end for the receiving end here is called the first reference signal resource. Accordingly, the same is true at the receiving end side.

For the sake of clarity and for distinguishing from other BPL identifiers mentioned in the description, the BPL identifier transmitted by the transmitting end to the receiving end is called the first BPL identifier. Accordingly, the same is true at the receiving end side.

Optionally, in a specific implementation and in the above-mentioned beam training method provided by the embodiment of the present application, the first mapping relationship specifically includes: the mapping relationship among BPL identifiers, CRIs and transmitting beams.

Optionally, in a specific implementation and in the above-mentioned method of indicating the beam information provided by the embodiment of the present application, the mapping relationship among BPL identifiers, CRIs and transmitting beams established at the base station side may be called the first mapping relationship, e.g., the mapping relationship as shown in the above Table 1.

Optionally, in a specific implementation and in the above-mentioned beam training method provided by the embodiment of the present application, the method further includes:
the transmitting end updating the first transmitting beam corresponding to the first BPL identifier in the first mapping relationship.

Optionally, in a specific implementation and in the above-mentioned beam training method provided by the embodiment of the present application, the transmitting end updates the first transmitting beam corresponding to the first BPL identifier in the first mapping relationship, which specifically includes:
the transmitting end transmitting a reference signal to the receiving end within the first reference signal resource so that the receiving end performs measurement and reporting for the reference signal;
the transmitting end updating the first transmitting beam corresponding to the first BPL identifier in the first mapping relationship according to the measurement reporting result for the reference signal transmitted by the receiving end (for example, it may be the mapping relationship as shown in the above Table 9).

Optionally, in a specific implementation and in the above-mentioned beam training method provided by the embodiment of the present application, the method further includes:
the transmitting end transmitting a reference signal to the receiving end within the first reference signal resource by using the first transmitting beam corresponding to the first BPL identifier so that the receiving end updates the second mapping relationship;
where the second mapping relationship specifically includes: the mapping relationship among BPL identifiers, CRIs and receiving beams.

Optionally, in a specific implementation and in the above-mentioned method of indicating the beam information provided by the embodiment of the present application, the mapping relationship among BPL identifiers, CRIs and receiving beams established at the terminal side may be called the second mapping relationship, e.g., the mapping relationship as shown in the above Table 5.

Optionally, in a specific implementation and in the above-mentioned beam training method provided by the embodiment of the present application, the receiving end updates the second mapping relationship, which specifically includes:
the receiving end updating the first receiving beam corresponding to the first BPL identifier in the second mapping relationship (for example, it may be the mapping relationship as shown in the above Table 10).

Optionally, in a specific implementation and in the above-mentioned beam training method provided by the embodiment of the present application, the transmitting end determines the first mapping relationship by way of:
the transmitting end configuring the second reference signal resource for the receiving end;
the transmitting end transmitting a reference signal to the receiving end within the second reference signal resource so that the receiving end performs measurement and reporting for the reference signal;
the transmitting end determining the first mapping relationship from the measurement reporting result for the reference signal transmitted by the receiving end.

Optionally, in a specific implementation and in the above-mentioned beam training method provided by the embodiment of the present application, the method further includes:
the transmitting end transmitting the mapping relationship between BPL identifiers and CRIs (for example, it may be the mapping relationship as shown in the above Table 4) to the receiving end.

Figure 5:
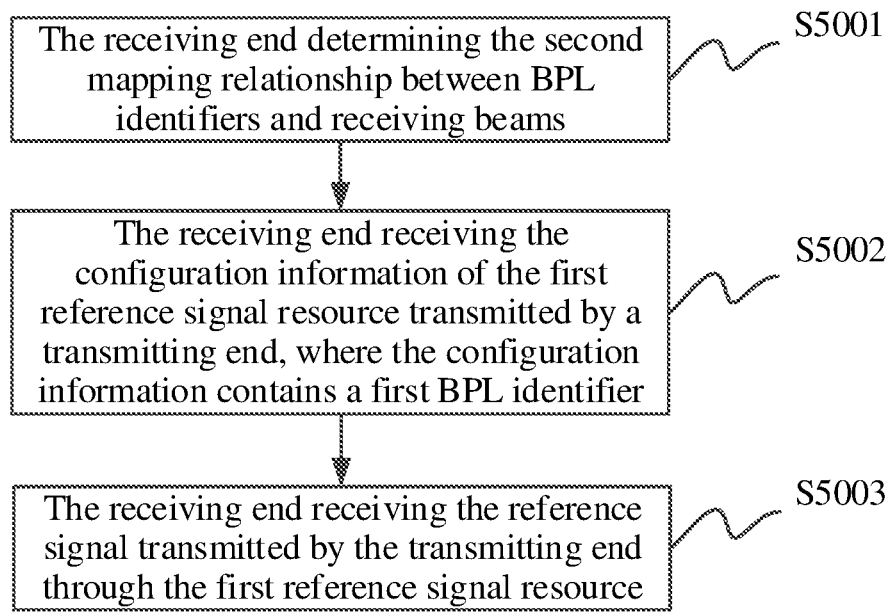
FIG. 5 is a flow schematic diagram of a beam training method (receiving end) provided by an embodiment of the present application.

Correspondingly, as shown in FIG. 5, at the receiving end, a beam training method provided by an embodiment of the present application includes:
Step S5001: the receiving end determining the second mapping relationship between BPL identifiers and receiving beams;
Step S5002: the receiving end receiving the configuration information of the first reference signal resource transmitted by a transmitting end, where the configuration information contains a first BPL identifier;
Step S5003: the receiving end receiving the reference signal transmitted by the transmitting end through the first reference signal resource.

Optionally, in a specific implementation and in the above-mentioned beam training method provided by the embodiment of the present application, the second mapping relationship specifically includes: the mapping relationship among BPL identifiers, CRIs and receiving beams.

Optionally, in a specific implementation and in the above-mentioned beam training method provided by the embodiment of the present application, the method further includes:
the receiving end updating the first receiving beam corresponding to the first BPL identifier in the second mapping relationship.

Optionally, in a specific implementation and in the above-mentioned beam training method provided by the embodiment of the present application, the receiving end updates the first transmitting beam corresponding to the first BPL identifier in the second mapping relationship, which specifically includes:
the receiving end receiving the reference signal transmitted by the transmitting end, and updating the first receiving beam corresponding to the first BPL identifier in the second mapping relationship according to the measurement result for the reference signal.

Optionally, in a specific implementation and in the above-mentioned beam training method provided by the embodiment of the present application, the receiving end receives the reference signal by using the first receiving beam corresponding to the first BPL identifier;

the method further includes:
the receiving end reporting the measurement result for the reference signal to the transmitting end so that the transmitting end updates the first mapping relationship;
where the first mapping relationship specifically includes: the mapping relationship among BPL identifiers, CRIs and transmitting beams.

Optionally, in a specific implementation and in the above-mentioned beam training method provided by the embodiment of the present application, the transmitting end updates the first mapping relationship, which specifically includes:
the transmitting end updating the transmitting beam corresponding to the first BPL identifier in the first mapping relationship.

Optionally, in a specific implementation and in the above-mentioned beam training method provided by the embodiment of the present application, the receiving end determines the second mapping relationship by way of:
the receiving end receiving the configuration information of the second reference signal resource transmitted by the transmitting end within the second reference signal resource;
the receiving end receiving the reference signal transmitted by the transmitting end within the second reference signal resource, determining the receiving beams corresponding to each second reference signal resource, and determining the mapping relationship between CRIs and receiving beams;
the receiving end receiving the mapping relationship between BPL identifiers and CRIs transmitted by the transmitting end;
the receiving end determining the second mapping relationship according to the mapping relationship between CRIs and receiving beams as well as the mapping relationship between BPL identifiers and CRIs.

Corresponding to the above-mentioned methods, the embodiments of the present application further provide the following devices.

Figure 6:
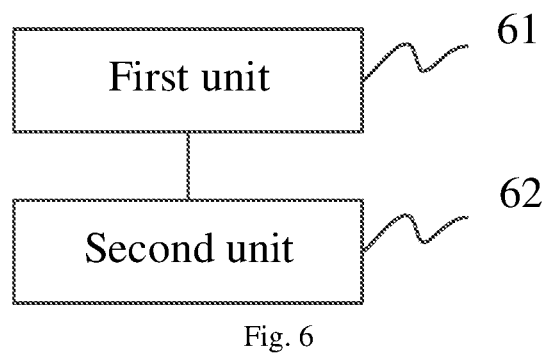
FIG. 6 is a structural schematic diagram of a beam training device (transmitting end) provided by an embodiment of the present application.

Referring to FIG. 6, at the transmitting end, a beam training device provided by an embodiment of the present application includes: a first unit 61 configured to determine the first mapping relationship between BPL identifiers and transmitting beams; a second unit 62 configured to configure the first reference signal resource for a receiving end, and transmit the configuration information of the first reference signal resource to the receiving end, where the configuration information carries a first BPL identifier.

Optionally, in the above-mentioned beam training device provided by the embodiment of the present application, the first mapping relationship specifically includes: the mapping relationship among BPL identifiers, CRIs and transmitting beams.

Optionally, in the above-mentioned beam training device provided by the embodiment of the present application, the first unit 61 is further configured to:
update the first transmitting beam corresponding to the first BPL identifier in the first mapping relationship.

Optionally, in the above-mentioned beam training device provided by the embodiment of the present application, the first unit 61 updates the first transmitting beam corresponding to the first BPL identifier in the first mapping relationship, which specifically includes:
transmitting a reference signal to the receiving end within the first reference signal resource so that the receiving end performs measurement and reporting for the reference signal;
updating the first transmitting beam corresponding to the first BPL identifier in the first mapping relationship according to the measurement reporting result for the reference signal transmitted by the receiving end.

Optionally, in the above-mentioned beam training device provided by the embodiment of the present application, the second unit 62 is further configured to:
transmit a reference signal to the receiving end within the first reference signal resource by using the first transmitting beam corresponding to the first BPL identifier so that the receiving end updates the second mapping relationship;
where the second mapping relationship specifically includes: the mapping relationship among BPL identifiers, CRIs and receiving beams.

Optionally, in the above-mentioned beam training device provided by the embodiment of the present application, the receiving end updates the second mapping relationship, which specifically includes:
the receiving end updating the first receiving beam corresponding to the first BPL identifier in the second mapping relationship.

Optionally, in the above-mentioned beam training device provided by the embodiment of the present application, the first unit 61 determines the first mapping relationship by:
configuring the second reference signal resource for the receiving end;
transmitting a reference signal to the receiving end within the second reference signal resource so that the receiving end performs measurement and reporting for the reference signal;
determining the first mapping relationship from the measurement reporting result for the reference signal transmitted by the receiving end.

Optionally, in the above-mentioned beam training device provided by the embodiment of the present application, the second unit 62 is further configured to:
transmit the mapping relationship between BPL identifiers and CRIs to the receiving end.

Figure 7:
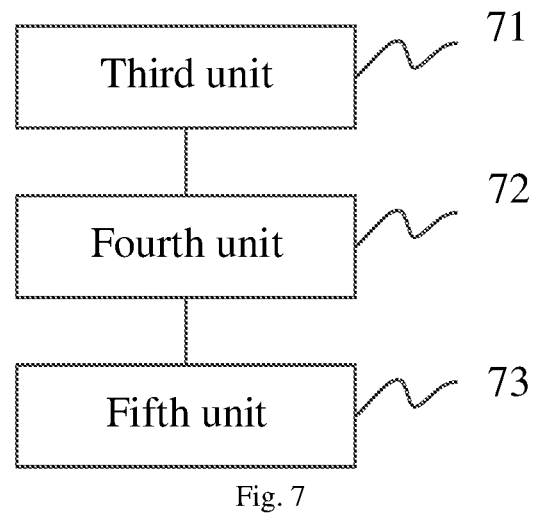
FIG. 7 is a structural schematic diagram of a beam training device (receiving end) provided by an embodiment of the present application.

Referring to FIG. 7, at the receiving end, a beam training device provided by an embodiment of the present application includes:
a third unit 71 configured to determine the second mapping relationship between BPL identifiers and receiving beams;
a fourth unit 72 configured to receive the configuration information of the first reference signal resource transmitted by a transmitting end, where the configuration information contains a first BPL identifier;
a fifth unit 73 configured to receive the reference signal transmitted by the transmitting end through the first reference signal resource.

Optionally, in the above-mentioned beam training device provided by the embodiment of the present application, the second mapping relationship specifically includes: the mapping relationship among BPL identifiers, CRIs and receiving beams.

Optionally, in the above-mentioned beam training device provided by the embodiment of the present application, the third unit 71 is further configured to:

update the first receiving beam corresponding to the first BPL identifier in the second mapping relationship.

Optionally, in the above-mentioned beam training device provided by the embodiment of the present application, the third unit 71 updates the first receiving beam corresponding to the first BPL identifier in the second mapping relationship, which specifically includes:
receiving the reference signal transmitted by the transmitting end, and updating the first receiving beam corresponding to the first BPL identifier in the second mapping relationship according to the measurement result for the reference signal.

Optionally, in the above-mentioned beam training device provided by the embodiment of the present application, the fifth unit 73 receives the reference signal by using the first receiving beam corresponding to the first BPL identifier;
the fifth unit 73 is further configured to:
report the measurement result for the reference signal to the transmitting end so that the transmitting end updates the first mapping relationship;
where the first mapping relationship specifically includes: the mapping relationship among BPL identifiers, CRIs and transmitting beams.

Optionally, in the above-mentioned beam training device provided by the embodiment of the present application, the transmitting end updates the first mapping relationship, which specifically includes:
the transmitting end updating the transmitting beam corresponding to the first BPL identifier in the first mapping relationship.

Optionally, in the above-mentioned beam training device provided by the embodiment of the present application, the third unit 71 determines the second mapping relationship by:
receiving the configuration information of the second reference signal resource transmitted by the transmitting end;
receiving the reference signal transmitted by the transmitting end within the second reference signal resource, determining the receiving beam corresponding to each second reference signal resource, and determining the mapping relationship between CRIs and receiving beams;
receiving the mapping relationship between BPL identifiers and CRIs transmitted by the transmitting end;
determining the second mapping relationship according to the mapping relationship between CRIs and receiving beams as well as the mapping relationship between BPL identifiers and CRIs.

Figure 8:
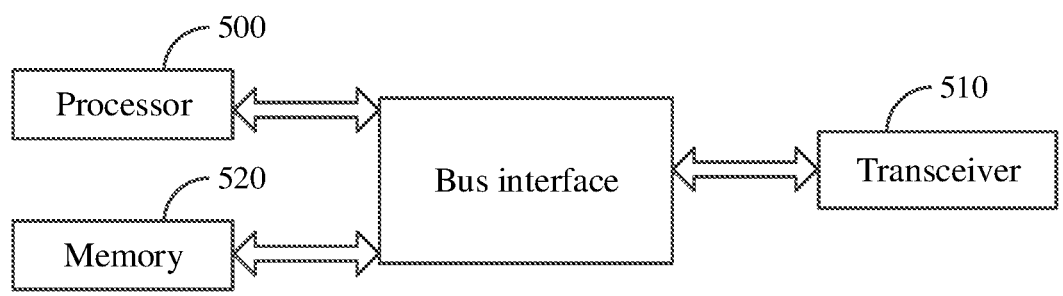
FIG. 8 is a structural schematic diagram of another beam training device (transmitting end) provided by an embodiment of the present application.

Referring to FIG. 8, at the transmitting end, another beam training device provided by an embodiment of the present application includes:
a processor 500 configured to read the programs in a memory 520 to perform the process of:
determining the first mapping relationship between BPL identifiers and transmitting beams;
configuring the first reference signal resource for a receiving end, and transmitting the configuration information of the first reference signal resource to the receiving end via a transceiver 510, where the configuration information carries a first BPL identifier.

Optionally, the first mapping relationship specifically includes: the mapping relationship among BPL identifiers, CRIs and transmitting beams.

Optionally, the processor 500 is further configured to:
update the first transmitting beam corresponding to the first BPL identifier in the first mapping relationship.

Optionally, when updating the first transmitting beam corresponding to the first BPL identifier in the first mapping relationship, the processor 500 specifically performs the steps of:
transmitting the reference signal to the receiving end via the transceiver 510 within the first reference signal resource so that the receiving end performs measurement and reporting for the reference signal;
updating the first transmitting beam corresponding to the first BPL identifier in the first mapping relationship according to the measurement reporting result for the reference signal transmitted by the receiving end.

Optionally, the processor 500 is further configured to:
transmit the reference signal to the receiving end via the transceiver 510 within the first reference signal resource by using the first transmitting beam corresponding to the first BPL identifier so that the receiving end updates the second mapping relationship;
where the second mapping relationship specifically includes: the mapping relationship among BPL identifiers, CRIs and receiving beams.

Optionally, the receiving end updates the second mapping relationship, which specifically includes:
the receiving end updating the first receiving beam corresponding to the first BPL identifier in the second mapping relationship.

Optionally, the processor 500 determines the first mapping relationship by:
configuring the second reference signal resource for the receiving end;
transmitting the reference signal to the receiving end via the transceiver 510 within the second reference signal resource so that the receiving end performs measurement and reporting for the reference signal;
determining the first mapping relationship from the measurement reporting result for the reference signal transmitted by the receiving end.

Optionally, the processor 500 is further configured to:
transmit the mapping relationship between BPL identifiers and CRIs to the receiving end.

The transceiver 510 is configured to receive and send the data under the control of the processor 500.

Here, in FIG. 8, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 can be a plurality of elements, i.e., include a transmitter and a receiver, and provide the units for communicating with various other devices over the transmission media. The processor 500 is responsible for managing the bus architecture and general processing, and the memory 520 can store the data used by the processor 500 when performing the operations.

The processor 500 can be Central Processing Unit (CPU), Application Specific Integrated Circuit (ASIC), Field-Programmable Gate Array (FPGA) or Complex Programmable Logic Device (CPLD).

Figure 9:
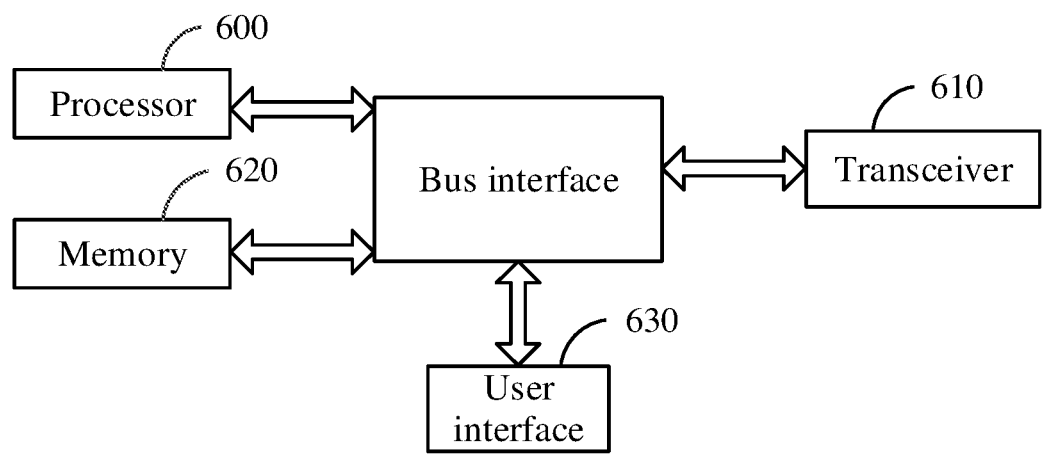
FIG. 9 is a structural schematic diagram of another beam training device (receiving end) provided by an embodiment of the present application.

Referring to FIG. 9, at the receiving end, a beam training device provided by an embodiment of the present application includes:
a processor 600 configured to read the programs in a memory 620 to perform the process of:

determining the second mapping relationship between BPL identifiers and receiving beams;

receiving via a transceiver 610 the configuration information of the first reference signal resource transmitted by a transmitting end, where the configuration information contains a first BPL identifier;

receiving via the transceiver 610 the reference signal transmitted by the transmitting end through the first reference signal resource.

Optionally, the second mapping relationship specifically includes: the mapping relationship among BPL identifiers, CRIs and receiving beams.

Optionally, the processor 600 is further configured to:

update the first receiving beam corresponding to the first BPL identifier in the second mapping relationship.

Optionally, when updating the first receiving beam corresponding to the first BPL identifier in the second mapping relationship, the processor 600 specifically performs the steps of:

receiving via the transceiver 610 the reference signal transmitted by the transmitting end, and updating the first receiving beam corresponding to the first BPL identifier in the second mapping relationship according to the measurement result for the reference signal.

Optionally, the processor 600 receives the reference signal by using the first receiving beam corresponding to the first BPL identifier;

the processor 600 is further configured to:

report the measurement result for the reference signal to the transmitting end so that the transmitting end updates the first mapping relationship;

where the first mapping relationship specifically includes: the mapping relationship among BPL identifiers, CRIs and transmitting beams.

Optionally, the transmitting end updates the first mapping relationship, which specifically includes:

the transmitting end updating the transmitting beam corresponding to the first BPL identifier in the first mapping relationship.

Optionally, the processor 600 determines the second mapping relationship by:

receiving via the transceiver 610 the configuration information of the second reference signal resource transmitted by the transmitting end;

receiving via the transceiver 610 the reference signal transmitted by the transmitting end within the second reference signal resource, determining the receiving beam corresponding to each second reference signal resource, and determining the mapping relationship between CRIs and receiving beams;

receiving via the transceiver 610 the mapping relationship between BPL identifiers and CRIs transmitted by the transmitting end;

determining the second mapping relationship according to the mapping relationship between CRIs and receiving beams as well as the mapping relationship between BPL identifiers and CRIs.

The transceiver 610 is configured to receive and send the data under the control of the processor 600.

Here, in FIG. 9, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 may be Central Processing Unit (CPU), Application Specific Integrated Circuit (ASIC), Field-Programmable Gate Array (FPGA) or Complex Programmable Logic Device (CPLD).

Correspondingly, an embodiment of the present application further provides a communication system including any one of the above-mentioned beam training devices, that is, the communication system (or it may also be called the communication device) provided by the embodiment of the present application may have all or some of the functions of the device of indicating the beam information and the device of determining the beam information simultaneously.

To sum up, in the above-mentioned solutions provided by the embodiments of the present application, the mapping relationship between BPL identifiers and CRIs is configured for the receiving end at the transmitting end, and the first BPL identifier is carried in the configuration information of the reference signal resource, so that only the BPL identifier is required to enable the receiving end receiving the reference signal resource transmitted by the transmitting end to determine the receiving beam, and the BPL identifier is further used by the transmitting end and the receiving end to maintain and update the BPL mapping relationship, thereby reducing the system overhead of the beam training process.

It should be understood by those skilled in the art that the embodiments of the invention can provide methods, systems and computer program products. Thus, the invention can take the form of hardware embodiments alone, software embodiments alone, or embodiments combining the software and hardware aspects. Also, the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus, the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus, the invention is also intended to encompass these modifications and variations therein as long as these modifications and variations to the embodiments of the invention come into the scope of the claims of the invention and their equivalents.

What is claimed is:

1. A beam training method, comprising:
    determining, by a transmitting end, a first mapping relationship comprising a mapping relationship among Beam Pair Link, BPL, identifiers, Channel state information reference signal Resource Indicators, CRIs, and transmitting beams;
    configuring, by the transmitting end, first reference signal resource for a receiving end, and transmitting configuration information of the first reference signal resource to the receiving end, wherein the configuration information comprises a first BPL identifier;
    determining, by the transmitting end, a first transmitting beam; and
    transmitting, by the transmitting end, a reference signal to the receiving end, by using the first transmitting beam within the first reference signal resource, so that the receiving end receives the reference signal on the first reference signal resource.

2. The method according to claim 1, wherein the method further comprises:
    updating, by the transmitting end, the first transmitting beam corresponding to the first BPL identifier in the first mapping relationship.

3. The method according to claim 2, wherein updating, by the transmitting end, the first transmitting beam corresponding to the first BPL identifier in the first mapping relationship, specifically comprises:
    receiving, by the transmitting end, a measurement result for the reference signal;
    updating, by the transmitting end, the first transmitting beam corresponding to the first BPL identifier in the first mapping relationship according to the measurement result for the reference signal transmitted by the receiving end.

4. The method according to claim 1, wherein the transmitting end determines the first mapping relationship by:
    configuring, by the transmitting end, second reference signal resource for the receiving end;
    transmitting, by the transmitting end, a reference signal to the receiving end within the second reference signal resource so that the receiving end performs measurement and reporting for the reference signal;
    determining, by the transmitting end, the first mapping relationship from a measurement reporting result for the reference signal transmitted by the receiving end.

5. The method according to claim 1, wherein the method further comprises:
    transmitting, by the transmitting end, a mapping relationship between BPL identifiers and CRIs to the receiving end.

6. A beam training method, comprising:
    determining, by a receiving end, a second mapping relationship comprising a mapping relationship among Beam Pair Link, BPL, identifiers, Channel state information reference signal Resource Indicators, CRIs, and receiving beams;
    receiving, by the receiving end, configuration information of first reference signal resource transmitted by a transmitting end, wherein the configuration information comprises a first BPL identifier;
    receiving, by the receiving end, a reference signal transmitted by the transmitting end using a first transmitting beam within the first reference signal resource; wherein the first transmitting beam is determined by the transmitting end;
    performing, by the receiving end, a measurement for the reference signal; and
    updating, by the receiving end, a first receiving beam corresponding to the first BPL identifier in the second mapping relationship, according to a measure result for the reference signal.

7. The method according to claim 6, wherein the receiving end receives the reference signal by using the first receiving beam corresponding to the first BPL identifier;
    the method further comprises:
    reporting, by the receiving end, the measurement result for the reference signal to the transmitting end so that the transmitting end updates a first mapping relationship.

8. The method according to claim 7, wherein the transmitting end updating the first mapping relationship specifically comprises:
    the transmitting end updating a transmitting beam corresponding to the first BPL identifier in the first mapping relationship.

9. The method according to claim 6, wherein the receiving end determines the second mapping relationship by:
    receiving, by the receiving end, configuration information of second reference signal resource transmitted by the transmitting end;
    receiving, by the receiving end, a reference signal transmitted by the transmitting end within the second reference signal resource, determining a receiving beam corresponding to each second reference signal resource, and determining a mapping relationship between CRIs and receiving beams;
    receiving, by the receiving end, a mapping relationship between BPL identifiers and CRIs transmitted by the transmitting end;
    determining, by the receiving end, the second mapping relationship according to the mapping relationship between CRIs and receiving beams and the mapping relationship between BPL identifiers and CRIs.

10. A beam training device, comprising:
a processor configured to read programs in a memory to perform the beam training method according to claim 1;
a transceiver configured to receive and send data under control of the processor.

11. The device according to claim 10, wherein the processor is further configured to:
update the first transmitting beam corresponding to the first BPL identifier in the first mapping relationship.

12. The device according to claim 11, wherein the processor configured to update the first transmitting beam corresponding to the first BPL identifier in the first mapping relationship, specifically performs steps of:
receiving a measurement result for the reference signal via the transceiver;
updating the first transmitting beam corresponding to the first BPL identifier in the first mapping relationship according to the measurement result for the reference signal transmitted by the receiving end.

13. The device according to claim 10, wherein the processor determines the first mapping relationship by:
configuring second reference signal resource for the receiving end;
transmitting a reference signal to the receiving end via the transceiver within the second reference signal resource so that the receiving end performs measurement and reporting for the reference signal;
determining the first mapping relationship from a measurement reporting result for the reference signal transmitted by the receiving end.

14. The device according to claim 10, wherein the processor is further configured to:
transmit a mapping relationship between BPL identifiers and CRIs to the receiving end.

15. A beam training device, comprising:
a processor configured to read programs in a memory to perform the beam training method according to claim 6;
a transceiver configured to receive and send data under control of the processor.

16. The device according to claim 15, wherein the processor receives the reference signal by using a first receiving beam corresponding to the first BPL identifier;
the processor is further configured to:
report the measurement result for the reference signal to the transmitting end so that the transmitting end updates a first mapping relationship.

17. The device according to claim 16, wherein the transmitting end updating the first mapping relationship specifically comprises:
the transmitting end updating a transmitting beam corresponding to the first BPL identifier in the first mapping relationship.

18. The device according to claim 15, wherein the processor determines the second mapping relationship by:
receiving via the transceiver configuration information of second reference signal resource transmitted by the transmitting end;
receiving via the transceiver a reference signal transmitted by the transmitting end within the second reference signal resource, determining a receiving beam corresponding to each second reference signal resource, and determining a mapping relationship between CRIs and receiving beams;
receiving via the transceiver a mapping relationship between BPL identifiers and CRIS transmitted by the transmitting end;
determining the second mapping relationship according to the mapping relationship between CRIs and receiving beams and the mapping relationship between BPL identifiers and CRIs.

* * * * *